(12) United States Patent
Schwenk

(10) Patent No.: US 7,164,766 B2
(45) Date of Patent: Jan. 16, 2007

(54) METHOD FOR ADDRESSING TERMINALS

(75) Inventor: Joerg Schwenk, Henfenfeld (DE)

(73) Assignee: Deutsche Telekom AG, Bonn (DE)

( * ) Notice: Subject to any disclaimer, the term of this patent is extended or adjusted under 35 U.S.C. 154(b) by 908 days.

(21) Appl. No.: 10/333,381

(22) PCT Filed: Jul. 9, 2001

(86) PCT No.: PCT/EP01/07853

§ 371 (c)(1),
(2), (4) Date: Jan. 17, 2003

(87) PCT Pub. No.: WO02/11323

PCT Pub. Date: Feb. 7, 2002

(65) Prior Publication Data

US 2003/0128846 A1   Jul. 10, 2003

(30) Foreign Application Priority Data

Aug. 2, 2000   (DE) ................. 100 37 630

(51) Int. Cl.
*H04N 7/167* (2006.01)
(52) U.S. Cl. .................................. 380/241; 380/240
(58) Field of Classification Search ................ 380/239, 380/240, 241
See application file for complete search history.

(56) References Cited

U.S. PATENT DOCUMENTS

| | | | | |
|---|---|---|---|---|
| 5,539,822 A | * | 7/1996 | Lett ........................... | 380/211 |
| 5,557,677 A | * | 9/1996 | Prytz ......................... | 380/212 |
| 6,470,395 B1 | * | 10/2002 | Van Aken et al. .......... | 709/245 |
| 6,532,539 B1 | * | 3/2003 | Campinos et al. .......... | 713/150 |
| 2005/0152551 A1 | * | 7/2005 | Defreese et al. ............ | 380/255 |

FOREIGN PATENT DOCUMENTS

| | | |
|---|---|---|
| EP | 0866613 | 9/1998 |
| WO | 9843425 | 10/1998 |
| WO | 9843427 | 10/1998 |

OTHER PUBLICATIONS

Wool, Avishai, "Key Management for Encrypted Broadcast", ACM Transactions on Information and System Security, vol. 3, No. 2, May 200, pp. 107-134.*

* cited by examiner

*Primary Examiner*—Matthew Smithers
(74) *Attorney, Agent, or Firm*—Darby & Darby

(57) ABSTRACT

A method for addressing terminals for receiving television programs subject to charge includes dividing the terminals into respective groups, each group having a respective group address. A respective identifier is assigned to each of the terminals of a group, each identifier being a respective binary vector. A data word and the respective group address of a first group is sent so as to address predetermined terminals of the first group. The data word is generated by logically combining the respective binary vectors of the terminals of the first group with a further binary vector, the further binary vector indicating the predetermined terminals.

5 Claims, 1 Drawing Sheet

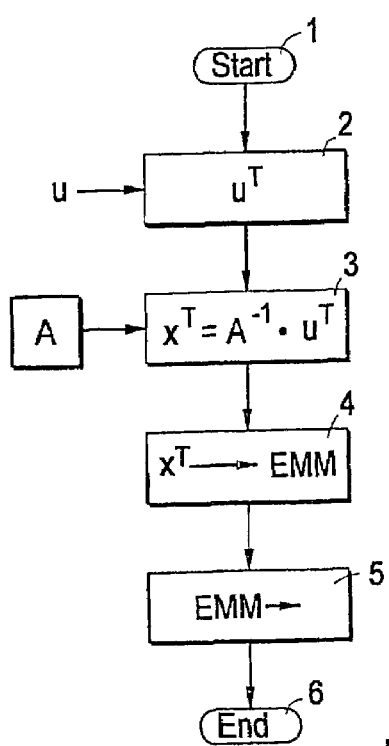
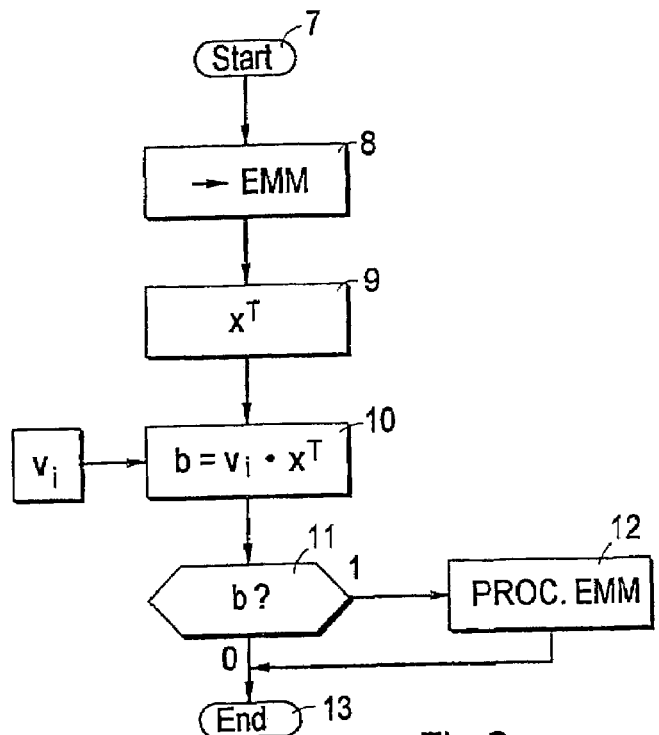

METHOD FOR ADDRESSING TERMINALS

BACKGROUND

The present invention relates to a method for addressing terminals for receiving television programs that are subject to charge, the terminals being divided into groups which each have a group address, and each of the terminals of a group being assigned an identifier within the group.

In systems for receiving television programs that are subject to charge (also referred to as pay-TV systems), it must be ensured that the programs that are subject to charge can only be received by the customers who are entitled thereto. This is accomplished by encoding the program contents, by storing reception rights in the security module of the terminal, and by adding reception conditions to the program.

Terminals for receiving programs which are subject to charge are known as so-called set-top boxes or decoders. However, other terminals are possible as well, such as PC cards or PCMCIA modules. It is also possible to integrate suitable terminals into the television receiver.

Mostly used as security modules are chip cards which are not are not firmly connected to the terminal but able to be removed therefrom. Because of this, one and the same terminal can be used by different users using an individual security module, respectively. However, herein the terminal itself together with the respective used security module are regarded as a terminal.

The program contents are encoded under the control of a so-called control word CW, with the DVB (=digital video broadcasting) Common Scrambling Algorithm being mainly used as the algorithm in MPEG-2 standard-based digital television in Europe. However, other algorithms have become known as well.

Reception conditions are added to a program in the form of so-called Entitlement Control Messages (ECM) which are transmitted with the program content. These ECMs are firmly associated with a program content. Besides the reception conditions, ECMs also contain the encrypted control word CW and a cryptographic checksum MAC to prevent manipulations.

Reception rights are transmitted in the form of so-called Entitlement Management Messages (EMM) in the same medium (cable, satellite, terrestrial broadcasting, ADSL) as the program contents. However, they are not firmly linked to the respective program content but to the logical address of the terminal of the customer or to that of the security module. EMMs can be addressed to individual customers or to groups of customers. Usually, EMMs contain also a service key SK in encrypted form in addition to the reception rights. This service key is required to reverse the encryption of the control words in the ECMs. EMMs can be (optionally partially) encrypted or unencrypted, but are protected from manipulations by a cryptographic checksum (MAC). An application of CW, ECM and EMM is described, for example, in German Patent Application DE 196 30 707 A1.

In many conditional access systems currently used, there exists a mechanism for addressing subsets of certain groups of terminals. To this end, the security modules of all customers are divided into groups of fixed size, generally $256=2^8$. Each group gets a group address and each customer is assigned an identifier by a position within the group. This position is added to die group address as a bitmap of the size 256. If the bit i in the bitmap is set to 1, then this means that the EMM concerns the customer who occupies the position i within the group. A 0 means that the EMM does not concern the terminal with the respective position. Thus, it is possible to address arbitrary subsets 1 to 256 of the group.

The security of this described method is now based on that the bitmaps in the EMMs cannot be changed, which is ensured by the MAC at the end of the EMM. However, attacks have become known where the MAC was falsified, thus allowing the bitmap to be falsified as well.

SUMMARY OF THE INVENTION

An object of the present invention is to make the addressing of the terminals more secure. In this context, the intention is for the computational effort to be as small as possible, in particular, in the terminal or in the security module because a great number of incoming EMMs must possibly be checked there.

The present invention provides a method for addressing terminals for receiving television programs subject to charge. The method includes: dividing the terminals into respective groups, each group having a respective group address; assigning a respective identifier to each of the terminals of a group, each identifier being a respective binary vector; sending a data word and the respective group address of a first group so as to address predetermined terminals of the first group; and generating the data word by logically combining the respective binary vectors of the terminals of the first group with a further binary vector, the further binary vector indicating the predetermined terminals. According to the present invention in that the identifier is a binary vector, that, in order to address terminals of a group, the group address and a data word are sent, and that the data word is generated by logically combining the binary vectors with a further binary vector that describes which of the terminals of the group are to be addressed.

In one embodiment of the method according to the present invention, which is particularly beneficial in terms of computational effort, the combining is performed by forming a binary matrix from the binary vectors and by multiplying the binary matrix by the further vector. In this context, preferably, provision is made for the further binary vector to contain a bit position for each terminal of the group, the bit position being set to a predetermined value if the terminal is to be addressed.

In the terminal or in the security module, the data word according to the present invention is preferably evaluated in that the binary vector which is assigned to the terminal and stored in the terminal is multiplied by the transmitted data word and in that the addressing is considered to be completed when this multiplication yields a predetermined binary value.

BRIEF DESCRIPTION OF THE DRAWINGS

The present invention is elaborated upon below based on exemplary embodiments with reference to the drawings, in which:

FIG. 1 shows a flow chart of method steps carried out at the transmitter end according to a method for addressing terminals;

FIG. 2 shows a flow chart of method steps carried out at the terminal end according to a method for addressing terminals;

FIG. 3 depicts the formation of a matrix containing binary vectors according to a method for addressing terminals;

FIG. 4 depicts generation of a data word to be transmitted according to a method for addressing terminals; and FIG. 5 depicts evaluation of a transmitted data word.

DETAILED DESCRIPTION

The flow charts shown in FIGS. 1 and 2 represent parts of programs which are executed at the transmitter end and in the security module or terminal as far as they concern the method according to the present invention. At the transmitter end, after starting at 1, vector u is read in which specifies the terminals to which an EMM is to be sent. Read-in vector u represents a single-row matrix which is transformed into matrix $u^T$ at 2.

In the next method step 3, a matrix is read in whose rows each represent a binary vector which is assigned to a terminal and has the length k. Data word $x^T$ to be transmitted is obtained by multiplication of inverted matrix $A^{-1}$ by matrix $u^T$. At 4, the data word is added to the EMM to be transmitted. At 5, the EMM, including data word $x^T$, is transmitted to the terminals via the respective medium. After that, the program is terminated at 6 or repeated to address further terminals.

In the terminal, after a program start 7, an EMM is identified in the incoming data stream at 8, and data word $x^T$ is separated from therefrom at 9. In program step 10, data word $x^T$ is then multiplied by the stored, individual vector $v_i$ of terminal i. If terminal i is addressed, result b is equal to 1, which is checked at 11, whereupon the EMM is processed at 12 using the known cryptographic methods.

However, if b=0, this means that the received EMM is not intended for this terminal. The program is then terminated at 13, without the EMM being processed further, i.e., for example, without the terminal being enabled to receive the respective programs.

In the numerical example shown in FIG. 3, binary vectors $v_1$ through $v_5$ of five terminals each constitute a row of a matrix A. This matrix is inverted and, according to FIG. 4, is multiplied, as a matrix $A^{-1}$, by matrix $u^T$ which says the first, the second and the fifth terminal of this group are to be addressed. A further matrix $x^T$ is formed by multiplication, the further matrix being added to the EMM as a data word.

FIG. 5 shows the checking of the data word in the receiver on the basis of the same numerical example for the receiver whose binary vector is $v_1$. This vector, which is stored in the security module, is multiplied by $x^T$, which yields 1 in the example shown.

What is claimed is:

1. A method for addressing terminals for receiving television programs subject to charge, comprising:
    dividing the terminals into respective groups, each group having a respective group address;
    assigning a respective identifier to each of the terminals of a group, each identifier being a respective binary vector;
    sending a data word and the respective group address of a first group so as to address predetermined terminals of the first group;
    and generating the data word by logically combining the respective binary vectors of the terminals of the first group with a further binary vector, the further binary vector indicating the predetermined terminals.

2. The method as recited in claim 1 wherein the logically combining is performed by forming a binary matrix from the respective binary vectors of the terminals of the first group and by multiplying the binary matrix by the further binary vector.

3. The method as recited in claim 2 wherein the further binary vector includes a respective bit position for each terminal of the first group, the respective bit position of each predetermined terminal being set to a predetermined bit position value.

4. The method as recited in claim 2 further comprising:
    storing, in a first terminal of the terminals, the respective binary vector of the first terminal; and multiplying the respective binary vector of the first terminal by the transmitted data word so as to consider the first terminal addressed when the multiplying yields a predetermined binary value.

5. The method as recited in claim 3 further comprising:
    storing, in a first terminal of the terminals, the respective binary vector of the first terminal; and multiplying the respective binary vector of the first terminal by the transmitted data word so as to consider the first terminal addressed when the multiplying yields a predetermined binary value.

* * * * *